(12) United States Patent
Boyanich (10) Patent No.: US 11,054,073 B2
(45) Date of Patent: Jul. 6, 2021

(54) HOSE BARB RETENTION DEVICE (71) Applicant: Dairy Industry a Corporation, Napa, CA (US)

(72) Inventor: John Boyanich, Vallejo, CA (US)

(73) Assignee: DAIRY INDUSTRY A CORPORATION, Napa, CA (US)

( * ) Notice: Subject to any disclaimer, the term of this patent is extended or adjusted under 35 U.S.C. 154(b) by 495 days.

(21) Appl. No.: 16/013,569

(22) Filed: Jun. 20, 2018

(65) Prior Publication Data

US 2018/0299049 A1 Oct. 18, 2018

Related U.S. Application Data

(63) Continuation-in-part of application No. 15/136,645, filed on Apr. 22, 2016, now Pat. No. 10,024,471.

(60) Provisional application No. 62/151,210, filed on Apr. 22, 2015.

(51) Int. Cl.
*F16L 33/02* (2006.01)
*F16L 33/22* (2006.01)
*F16L 33/30* (2006.01)

(52) U.S. Cl.
CPC ............... *F16L 33/02* (2013.01); *F16L 33/22* (2013.01); *F16L 33/30* (2013.01)

(58) Field of Classification Search
CPC ......... F16L 33/02; F16L 33/025; F16L 33/20; F16L 33/207; F16L 33/2071; F16L 33/2076; F16L 33/22
USPC ........................................ 285/242–253, 259
See application file for complete search history.

(56) References Cited

U.S. PATENT DOCUMENTS 3,017,203 A * 1/1962 Macleod .................. F16L 31/00
285/256
6,099,045 A * 8/2000 Pirona ................... F16L 13/143
285/256

* cited by examiner

*Primary Examiner* — Aaron M Dunwoody (57) ABSTRACT

A device for hose barb retention consists of a hose barb, a first plurality of serrations, a second plurality of serrations, an intermediate smooth lateral section, and a bumper. The first plurality of serrations helps create a tight seal between the hose barb and a hose section and thus, prevents leakages. The second plurality of serrations helps keep the hose section stationary along the hose barb and thus, prevents hose blowouts. The intermediate smooth lateral section, which is smooth, helps the user in inserting the hose barb into the hose section, and in removing the hose barb from the hose section. By mounting a hose band clamp against the bumper and adjacent the first end, the hose section is pressed against the hose barb. The bumper helps protect the hose barb and the hose band clamp.

7 Claims, 9 Drawing Sheets

HOSE BARB RETENTION DEVICE

The current application is a continuation-in-part (CIP) application of a U.S non-provisional application Ser. No. 15/136,645 filed on Apr. 22, 2016. The U.S. non-provisional application Ser. No. 15/136,645 claims a priority to a U.S. provisional application Ser. No. 62/151,210 filed on Apr. 22, 2015.

FIELD OF THE INVENTION

The present invention relates to a hose barb that is designed to eliminate common problems associated with hose assemblies used in wineries and other food and beverage processing plants. More specifically, the present invention relates to a hose barb design and banding system that prevents leaks around the hose barb, hose barb blowouts, hose barb damage, and a system that provides easier hose barb installation and removal.

BACKGROUND OF THE INVENTION

A hose barb is attached to a hose to facilitate connections to pumps, valves, tanks and other processing equipment. Certain factors need to be considered when designing a hose barb. Preventing leaks and blowouts are among the significant factors to be considered. In the wine industry, if wine starts leaking between the hose barb and hose, contamination can eventually occur. On the other hand, blowouts can result in significant financial loss. Thus, effective methods that can prevent leaks and blowouts are required.

One popular method to prevent leaks and blowouts is to manufacture hose barbs with a slightly larger outside diameter than the inside diameter of the hose it will be attached to. Although such methods help reduce leaks and blowouts, installation and removal become a more time consuming and difficult procedure. A common installation procedure to overcome the added difficulty is to place the end of the hose into hot water. As a result, the hose softens and allows easier hose barb insertion. Heating the hose is also used for hose barb removal. Another removal procedure requires cutting the hose around the hose barb. Regardless of the procedure used, the result is increased labor time and costs.

The objective of the present invention is to address the aforementioned issues. In doing so, the present invention introduces a hose barb that is machined with three distinct patterns. Each pattern is designed to eliminate one of the specific problems associated with current hose barb assemblies. The first is a serration pattern that prevents leaks. The second is a serration pattern that prevents hose barb movement and blowouts. The third is a smooth lateral pattern that eliminates time consuming installation and removal procedures. The preferred embodiment of the present invention incorporates a bumper that protects the hose barb and hose band clamp from damage. The bumper also acts as a stopping point that positions the hose and the hose band clamp over the hose barb for perfect banding alignment. Another benefit of the present invention is that all installation and removal can be completed on location with standard shop tools.

DETAIL DESCRIPTIONS OF THE INVENTION

All illustrations of the drawings are for the purpose of describing selected versions of the present invention and are not intended to limit the scope of the present invention.

The present invention introduces a hose barb and banding system for wineries and other food and beverage processing plants. The present invention relates to a hose barb and banding system that eliminates several problems associated with hose assemblies. The present invention is designed to stop leaks around the hose barb, prevent hose barb movement and blowouts, and prevent hose barb and hose band clamp damage. The present invention also provides easier hose barb installation and removal. The present invention utilizes a reusable hose band clamp and allows the user to complete installation and removal on location with standard shop tools.

As seen in FIGS. 1-3B, to obtain the intended functionalities, the present invention comprises a hose barb 1, a first plurality of serrations 5, a second plurality of serrations 8, and an intermediate smooth lateral section 11. The hose barb 1, which can vary in size in different embodiments is preferably made of stainless steel and comprises a first end 2, a structural body 3, and a second end 4. The structural body 3, which is cylindrical in shape, extends from the first end 2 to the second end 4. The first plurality of serrations 5 and the second plurality of serrations 8 are used to hold a hose section 21 against the hose barb 1 and thus, create a tight seal between the hose section 21 and the hose barb 1 to prevent leakages. The intermediate smooth lateral section 11 is used to facilitate the process of attaching the hose section 21 and detaching the hose section 21 to the hose barb 1.

As seen in FIGS. 3B-8, the preferred embodiment of the present invention further comprises a bumper 12 to protect both the hose barb 1 and a hose band clamp 17. In the preferred embodiment, the bumper 12 is a removable nylon bumper. However, in other embodiments of the present invention, a permanent stainless-steel ring can also be used as the bumper 12.

Figure 3A:
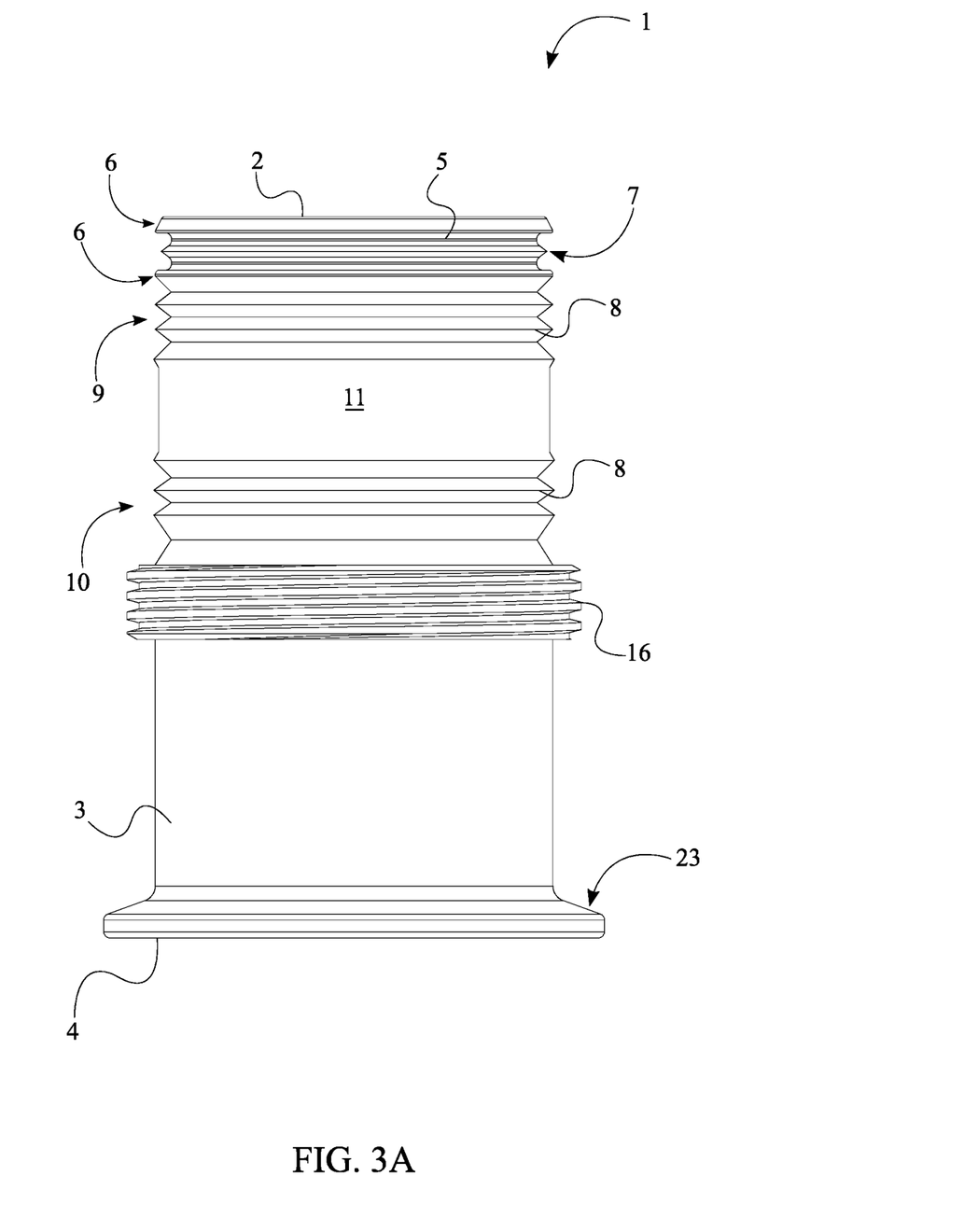
FIG. 3A is a side view of the hose barb in the preferred embodiment of the present invention.
Figure 3B:
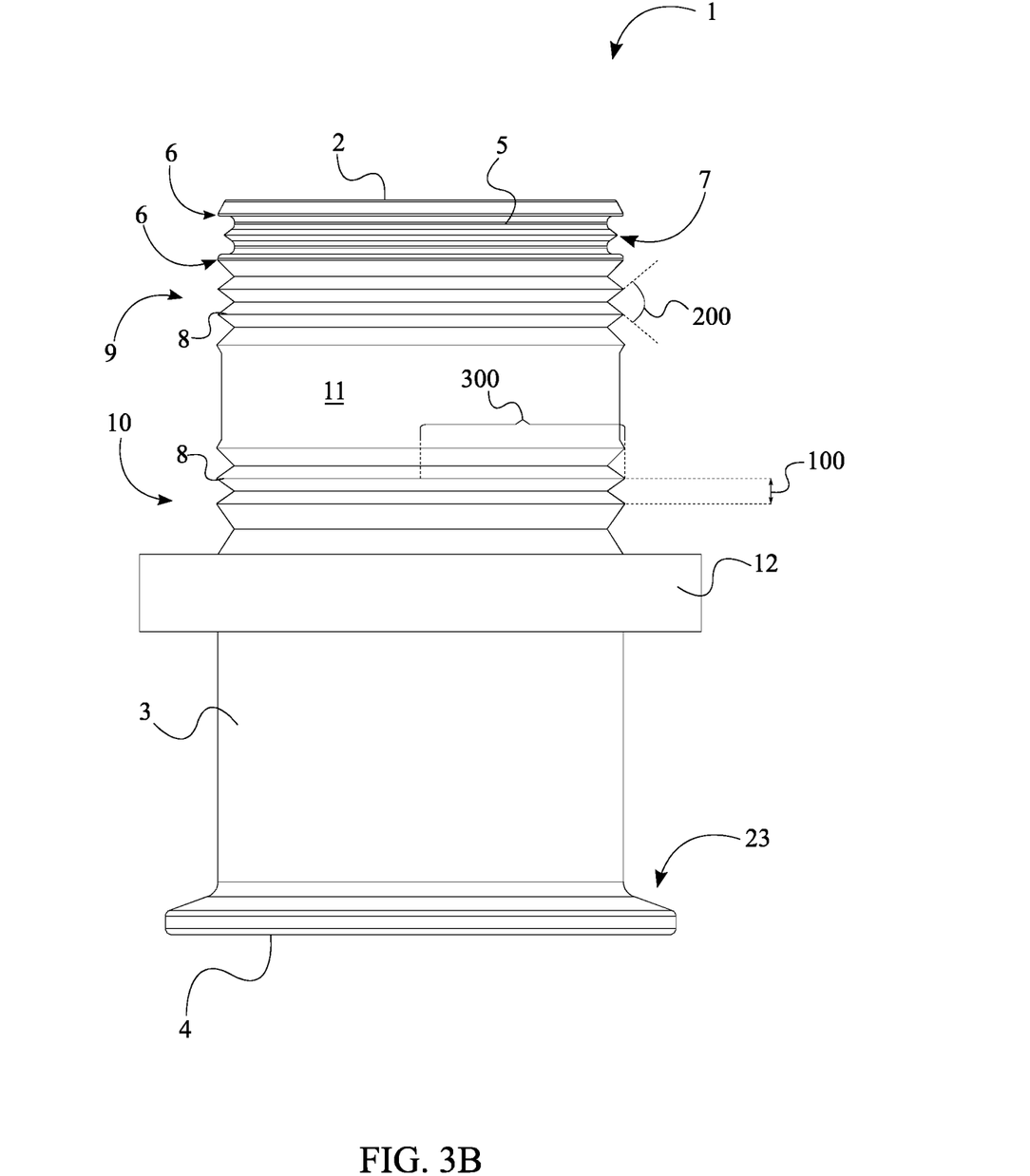
FIG. 3B is a side view of the preferred embodiment of the hose barb, wherein the bumper is mounted onto the hose barb.

The first plurality of serrations 5 is intended to prevent liquid from getting in between the hose section 21 and the hose barb 1. As seen in FIG. 3A and FIG. 3B, the first plurality of serrations 5 is distributed longitudinally along the structural body 3 adjacent the first end 2. The positioning and the design of the first plurality of serrations 5 creates a seal between the hose section 21 and the hose barb 1 at the first end 2.

Figure 1:
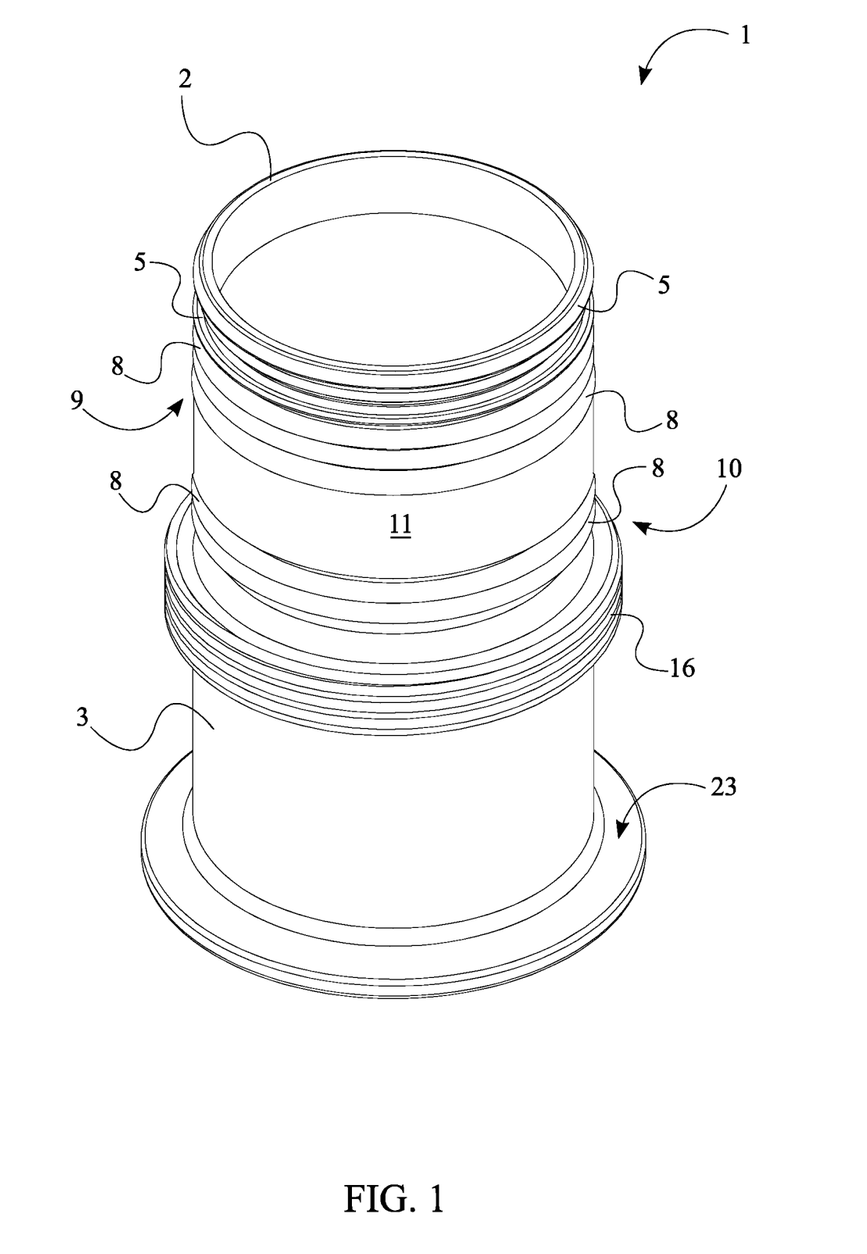
FIG. 1 is a perspective view of the hose barb in the preferred embodiment of the present invention.
Figure 2:
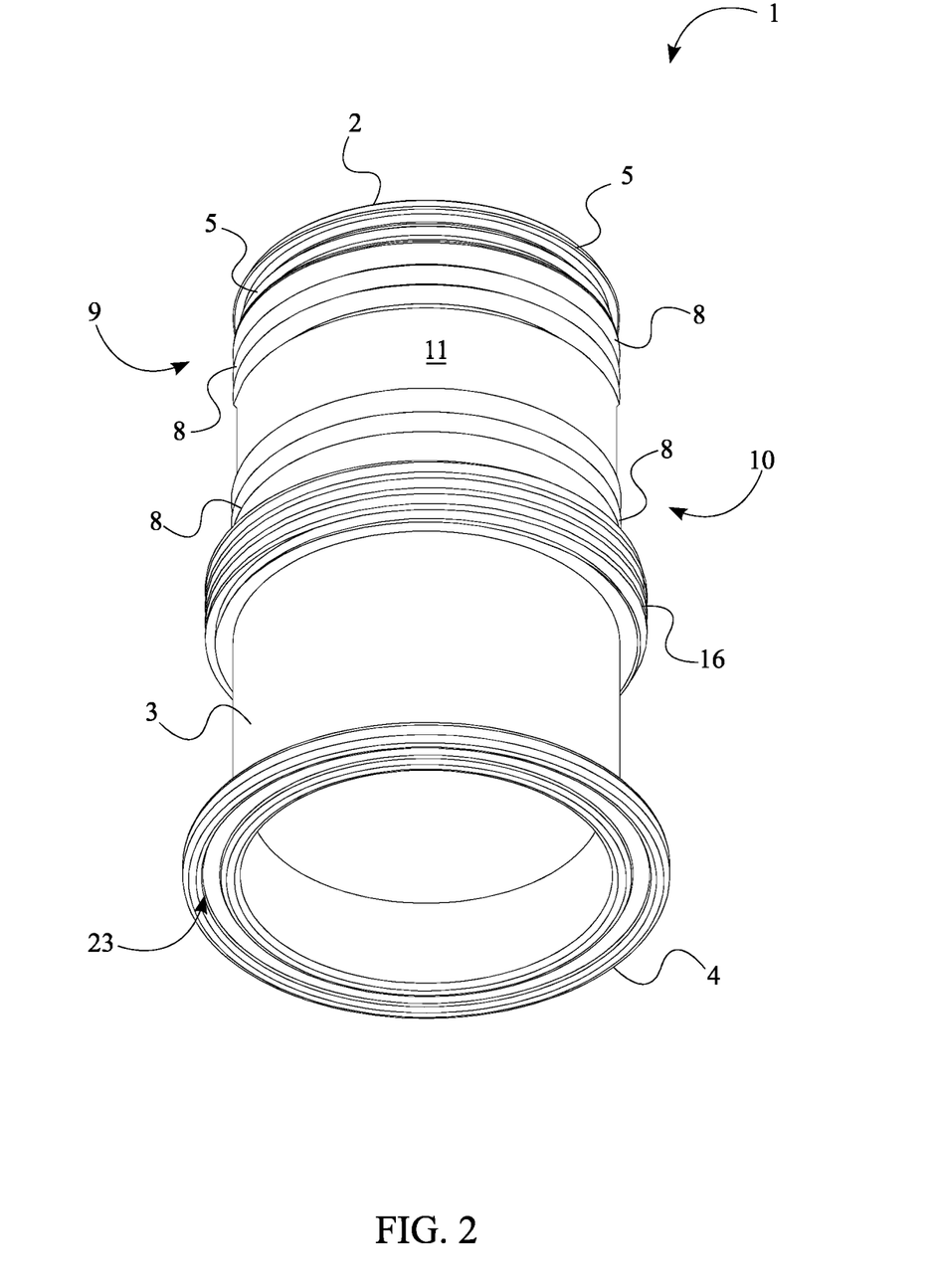
FIG. 2 is a bottom perspective view of the hose barb in the preferred embodiment of the present invention.
Figure 5:
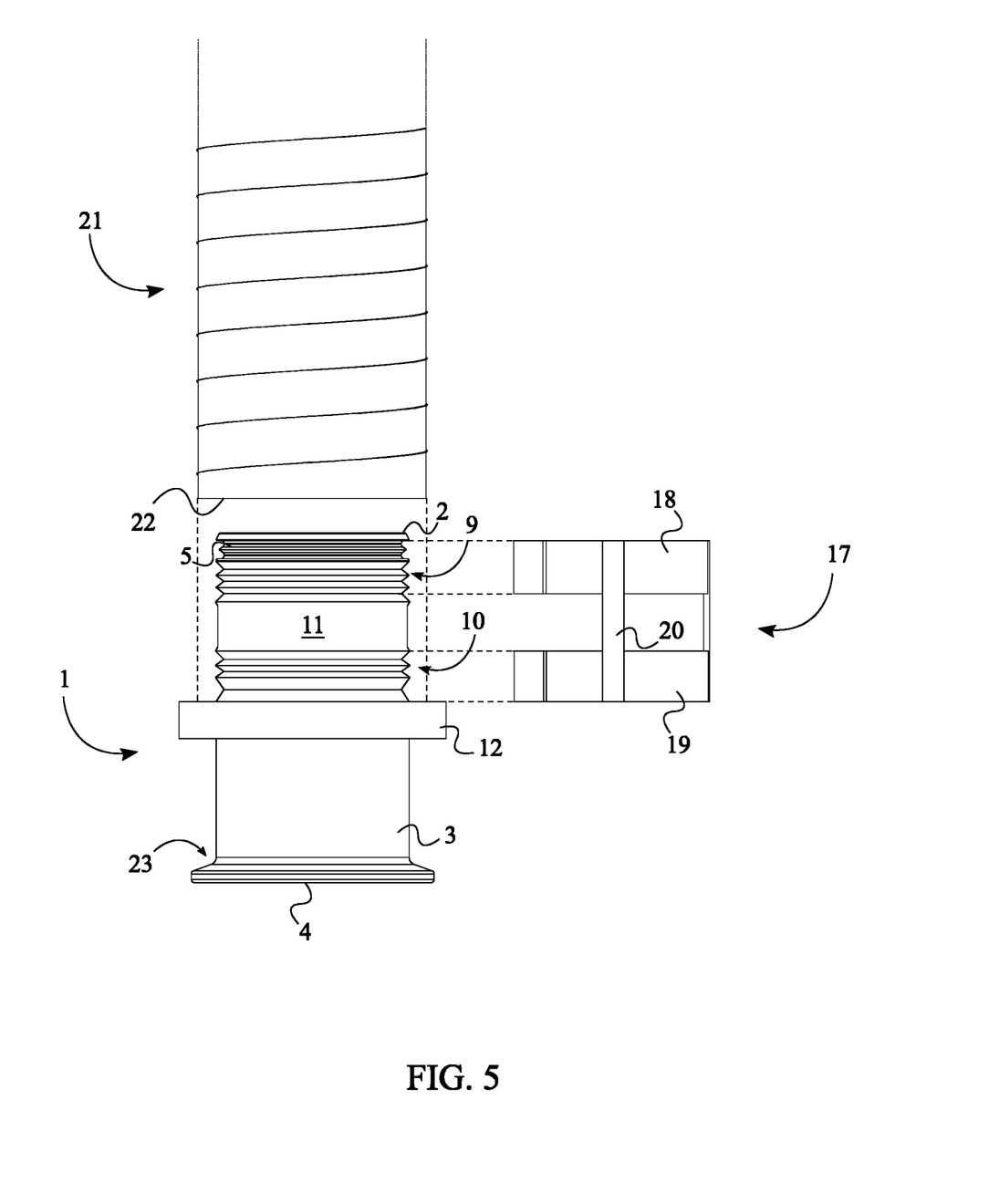
FIG. 5 is an exploded side view of the hose barb, the hose section, and the hose band clamp.

Hose blowouts occur when an attachment end 22 of the hose section 21, seen in FIG. 5, moves along the hose barb 1. As illustrated in FIG. 1 and FIG. 2, the present invention utilizes the second plurality of serrations 8 to prevent the hose section 21 from moving along the hose barb 1 and thus, prevent hose barb blowouts. To do so, the second plurality of serrations 8 comprises a first serrated portion 9 and a second serrated portion 10 that dig into the hose section 21. The first serrated portion 9 is distributed along the structural body 3 adjacent the first plurality of serrations 5 opposite the first end 2. The second serrated portion 10 is also distributed along the structural body 3 such that the intermediate smooth lateral section 11 is positioned in between the first serrated portion 9 and the second serrated portion 10. More specifically, the intermediate smooth lateral section 11 is positioned along the structural body 3 adjacent the first serrated portion 9 opposite the first plurality of serrations 5. Thus, the second serrated portion 10 is distributed along the structural body 3 adjacent the intermediate smooth lateral section 11 opposite the first serrated portion 9. Therefore, when considering an overall configuration from the first end 2 to the second end 4, the first plurality of serrations 5, the first serrated portion 9 of the second plurality of serrations 8, the intermediate smooth lateral section 11, and the second serrated portion 10 of the second plurality of serrations 8 are positioned serially adjacent to each other.

As illustrated in FIG. 3B, when considering a specific serration and an adjacent serration from the second plurality of serrations 8, a pitch 100 and an angle 200 between the specific serration and the adjacent serration is designed so that the specific serration and the adjacent serration firmly press against an internal wall of the hose section 21. Moreover, a radius 300 of each of the plurality of second serrations 8 is also designed such that the second plurality of serrations 8 remain firmly pressed against the interior wall of the hose section 21.

The intermediate smooth lateral section 11, which is shown in FIGS. 1-3B, is designed to facilitate easier insertion of the hose barb 1 into the hose section 21 or when removing the hose barb 1 from the hose section 21. In other words, the intermediate smooth lateral section 11 facilitates the linear movement of the hose section 21 along the structural body 3 during insertion and removal. To do so, in the preferred embodiment of the present invention, the intermediate smooth lateral section 11 is designed to have a smooth outer surface. Moreover, in the preferred embodiment, a radius of the intermediate smooth lateral section 11 is less than the radius 300 of the second plurality of serrations 8. The overall surface area of the intermediate smooth lateral section 11 can vary in different embodiments of the present invention.

Figure 7:
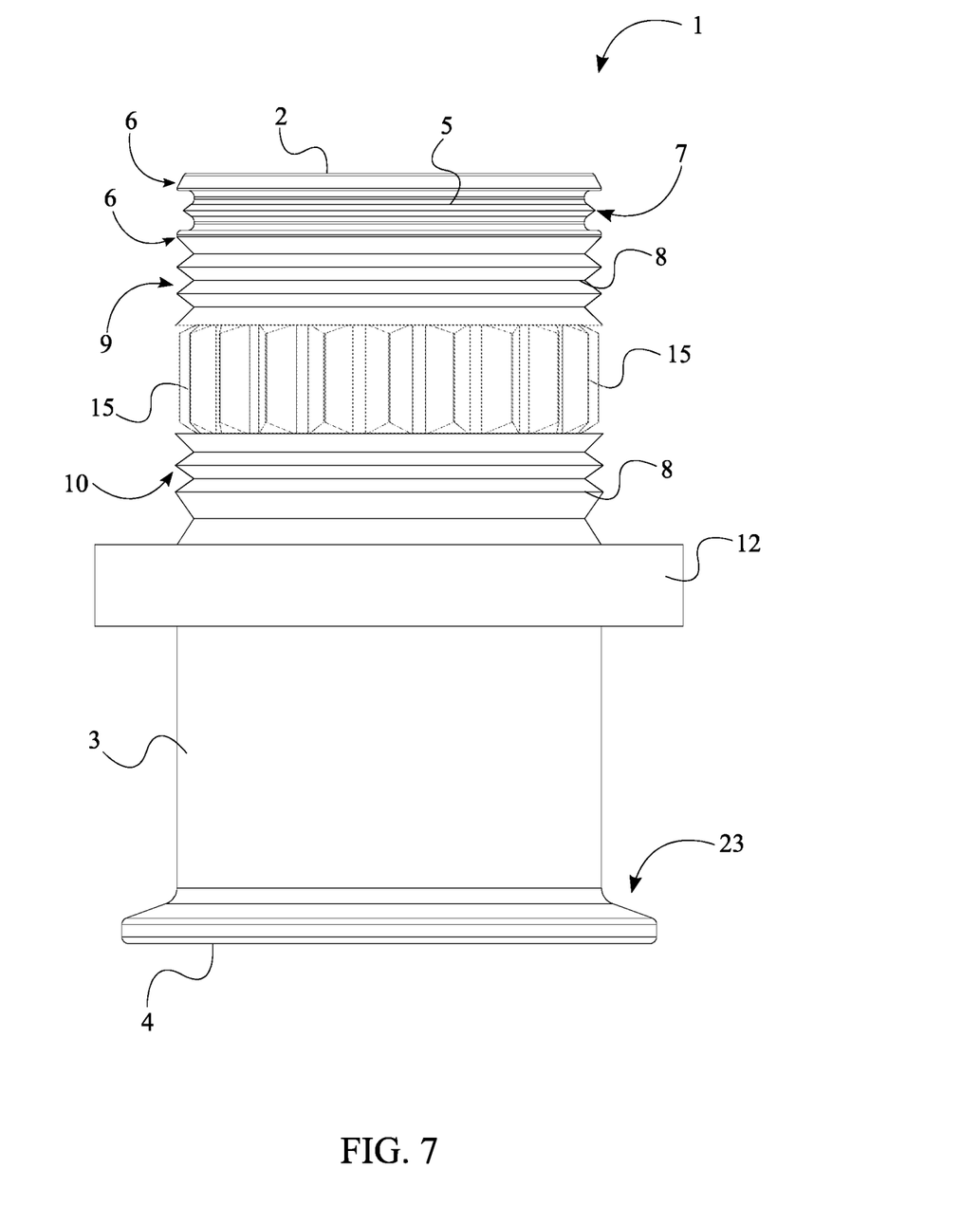
FIG. 7 is a side view of the hose barb, wherein a third plurality of serrations is illustrated.
Figure 8:
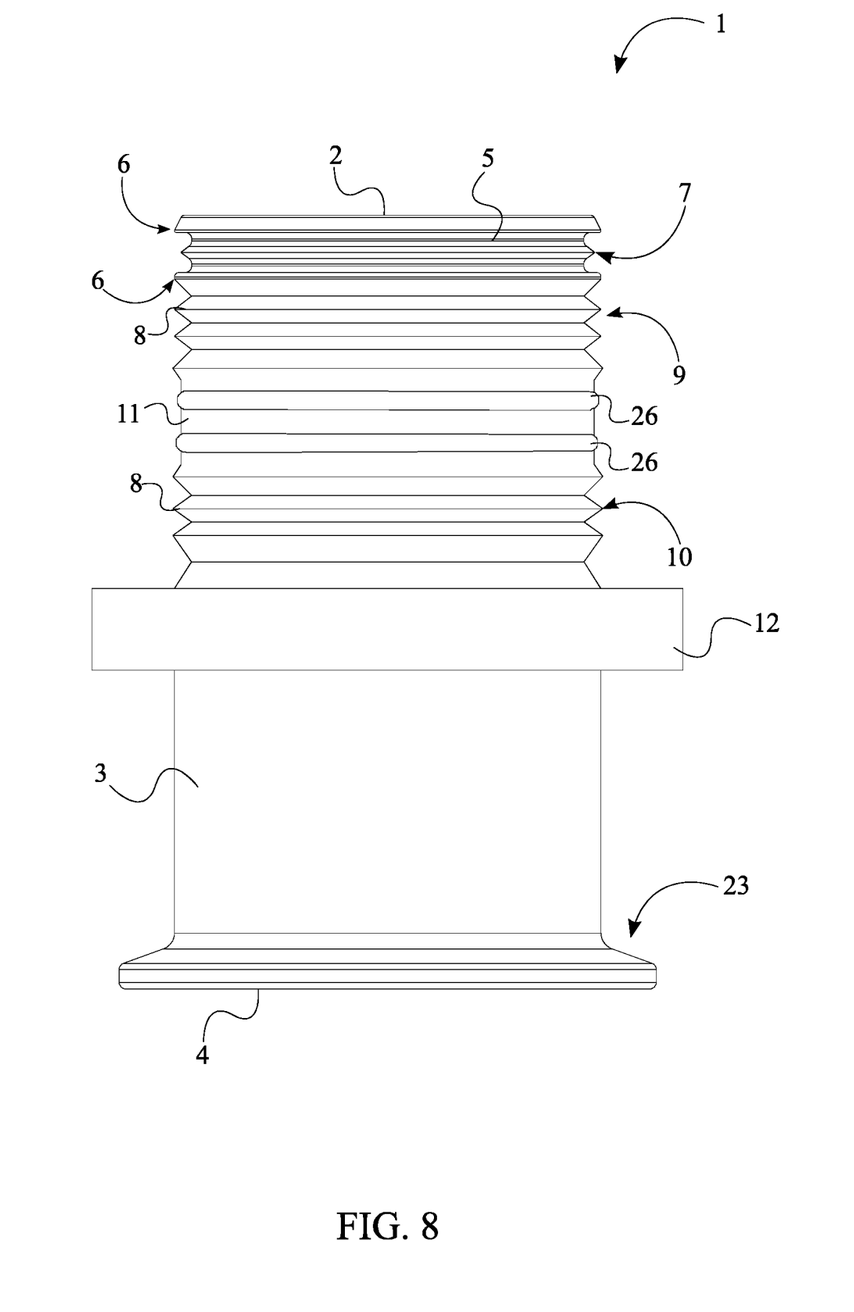
FIG. 8 is a side view of the hose barb, wherein a pair of semi-circular bands is illustrated.

As seen in FIG. 7, in another embodiment of the present invention, to facilitate the insertion and removal, the present invention comprises a third plurality of serrations 15 that is distributed along the intermediate smooth lateral section 11 in between the first serrated portion 9 and the second serrated portion 10. Each of the third plurality of serrations 15 will be oriented perpendicular to each of the second plurality of serrations 8. As seen in FIG. 8, in another embodiment of the present invention, to facilitate the insertion and removal, the present invention can include a pair of semi-circular bands 26 that is perimetrically positioned along the intermediate smooth lateral section 11.

As discussed before, the bumper 12 is used to protect both the hose barb 1 and the hose band clamp 17. To position the bumper 12 in an optimal position, the hose barb 1 is concentrically aligned with the bumper 12. When aligned, the bumper 12 is mounted along the structural body 3 adjacent the second serrated portion 10 and opposite the intermediate smooth lateral section 11. The bumper 12 also functions as a stopper for the hose section 21 and the hose band clamp 17 perfectly aligning the hose band clamp 17 over the hose barb 1. By doing so, the clamping mechanism can maintain a tight hold of the hose section 21 around the first plurality of serrations 5 and the second plurality of serrations 8.

As discussed, the first plurality of serrations 5 is used to create a tight seal in between the hose section 21 and the hose barb 1. As seen in FIG. 3A and FIG. 3B, to create a secure seal between the hose barb 1 and the hose section 21, the first plurality of serrations 5 comprises a pair of surrounding edges 6 and an intermediate edge 7. The intermediate edge 7 is positioned in between each of the pair of surrounding edges 6, wherein a diameter of the pair of surrounding edges 6 is greater than a diameter of the intermediate edge 7. The difference in diameters of the pair of surrounding edges 6 and the intermediate edge 7 holds the hose against the hose barb 1 at the first end 2.

Figure 6:
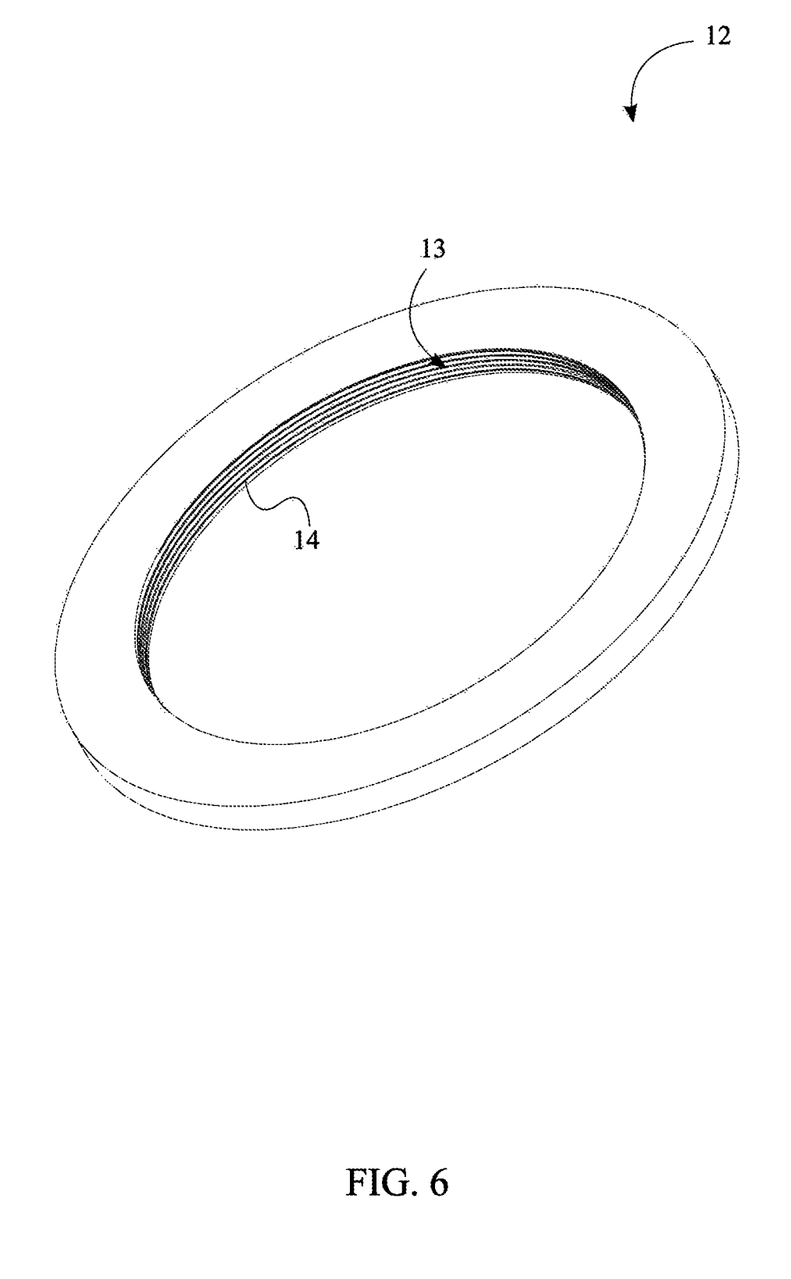
FIG. 6 is a perspective view of the bumper.

The bumper 12, illustrated in FIG. 3B, is used to protect both the hose barb 1 and the hose band clamp 17. In one embodiment of the present invention, the bumper 12 can be removably attached to the hose barb 1. In another embodiment of the present invention, the bumper 12 can be permanently connected to the hose barb 1. As seen in FIG. 3A, to allow the bumper 12 to be removably attached to the hose barb 1, the present invention further comprises a threaded portion 16. As seen in FIG. 6, to correspond with the threaded portion 16, the bumper 12 comprises an internal lateral surface 13 and a set of internal threads 14. The set of internal threads 14 is distributed along the internal lateral surface 13 so that the bumper 12 can be removably attached to the threaded portion 16 which is positioned adjacent the second serrated portion 10 and opposite the intermediate smooth lateral section 11. When removably attached to hose barb 1, the set of internal threads 14 is engaged with the threaded portion 16.

Figure 4:
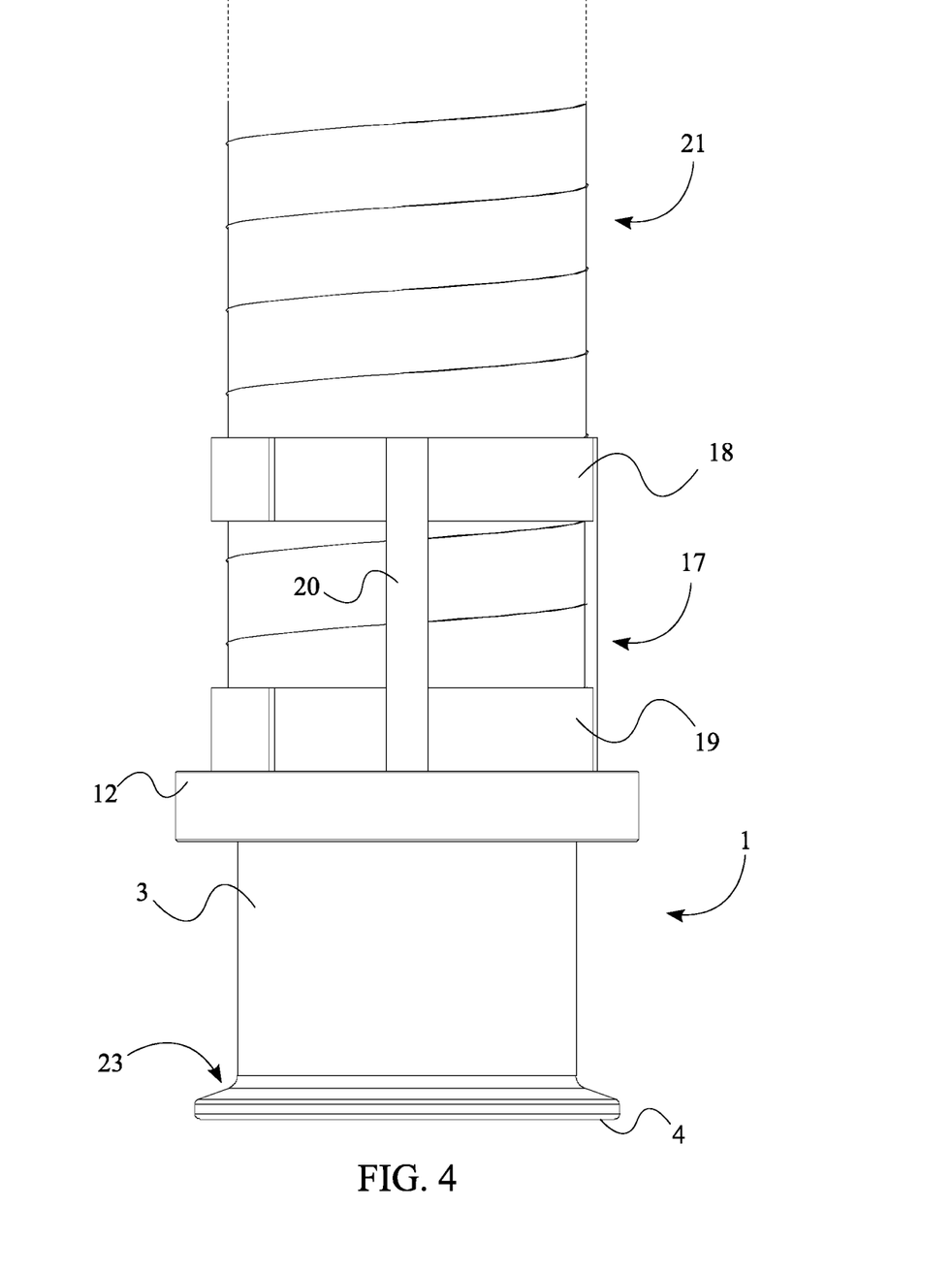
FIG. 4 is side view of the hose section being attached to the hose barb and secured by the hose band clamp.

As seen in FIG. 4 and FIG. 5, the present invention utilizes the hose band clamp 17 to press the hose section 21 against the hose barb 1 preventing any liquid from getting in between the hose barb 1 and the hose section 21. In the preferred embodiment, the hose band clamp 17 comprises a first circular band 18, a second circular band 19, and at least one connecting tab 20. The first circular band 18 is concentrically aligned with the second circular band 19. Moreover, the first circular band 18 is positioned adjacent the second circular band 19. To establish a connection between the first circular band 18 and the second circular band 19, a primary end of the at least one connecting tab 20 is terminally connected to the first circular band 18. On the other hand, a secondary end of the at least one connecting tab 20 is terminally connected to the second circular band 19, wherein the primary end and the secondary end are positioned opposite each other along the at least one connecting tab 20. The positioning of the first circular band 18 and the second circular band 19 allows the hose band clamp 17 to be positioned externally along the perimeter of the first plurality of serrations 5, the first serrated portion 9, and the second serrated portion 10 of the second plurality of serrations 8. As a result, leaks and hose blowouts are prevented.

As illustrated in FIG. 4, when a hose section 21 is attached, the hose barb 1 is positioned into the hose section 21 such that the first end 2, the first plurality of serrations 5, the second plurality of serrations 8, and the intermediate smooth lateral section 11 are sleeved by the hose section 21. As a result, an attachment end 22 of the hose section 21 is pressed against the bumper 12. More specifically the bumper 12 functions as a stopping point for both the the hose section 21 and the hose band clamp 17 to provide perfect alignment.

As illustrated in FIG. 5, when the hose band clamp 17 is used to keep the hose section 21 stationary against the hose barb 1, the first circular band 18 is perimetrically aligned with the first plurality of serrations 5 and the first serrated portion 9. On the other hand, the second circular band 19 is perimetrically aligned with the second serrated portion 10. To do so, a distance between the first circular band 18 and the second circular band 19 is equivalent to an overall height of the intermediate smooth lateral section 11. Moreover, the positioning of the bumper 12 ensures that the hose band clamp 17 is positioned perimetrically around the first plurality of serrations 5, the first serrated portion 9, and the second serrated portion 10. In the resulting position, the hose band clamp 17 is pressed against the bumper 12. To hold the hose section 21 against the hose barb 1, the hose section 21 is squeezed in between the hose band clamp 17 and the hose barb 1. To maintain the hold around the hose section 21, a first fastener and a second fastener is used. More specifically, the first fastener ensures that the first circular band 18 is pushed against the hose section 21. On the other hand, the second fastener ensures that the second circular band 19 is pushed against the hose section 21. Bolts, screws, latches, clamps, or other comparable fastening means can be used as the first fastener and the second fastener in the process of securing the hose section 21 against the hose barb 1.

When the present invention is in use, the following process flow is generally followed. Initially, the hose barb 1 is inserted into the hose section 21 at the first end 2. In doing so, the user ensures that the first end 2, the first plurality of serrations 5, the second plurality of serrations 8, and the intermediate smooth lateral section 11 are sleeved by the hose section 21. When inserted, the attachment end 22 of the hose section 21 will be positioned against the bumper 12. When inserting the hose barb 1 is complete, the hose band clamp 17 is mounted onto the hose section 21 so that the hose section 21 is pressed against the hose barb 1 preventing a liquid from getting in between the hose barb 1 and the hose section 21. In doing so, the first circular band 18 is perimetrically aligned with the first plurality of serrations 5 and the first serrated portion 9 of the second plurality of serrations 8. On the other hand, the second circular band 19 is perimetrically aligned with the second serrated portion 10 of the second plurality of serrations 8. Upon establishing a connection between the hose section 21 and the hose barb 1 adjacent the first end 2, the hose barb 1 is connected to an external tubing system or other comparable device at the second end 4. To aid with the attachment process at the second end 4, the present invention further comprises a tri-clamp 23 that is perimetrically connected at the second end 4.

Although the invention has been explained in relation to its preferred embodiment, it is to be understood that many other possible modifications and variations can be made without departing from the spirit and scope of the invention as hereinafter claimed.

What is claimed is:

1. A device for hose barb retention comprises:
   a hose barb;
   a first plurality of serrations;
   a second plurality of serrations;
   an intermediate smooth lateral section;
   the hose barb comprises a first end, a structural body, and a second end;
   the second plurality of serrations comprises a first serrated portion and a second serrated portion;
   the structural body extending from the first end to the second end;
   the first plurality of serrations being distributed longitudinally along the structural body adjacent the first end;
   the first serrated portion being distributed along the structural body adjacent the first plurality of serrations opposite the first end;
   the intermediate smooth lateral section being positioned along the structural body adjacent the first serrated portion and opposite the first plurality of serrations;
   the second serrated portion being distributed along the structural body adjacent the intermediate smooth lateral section, and opposite the first serrated portion;
   the first plurality of serrations comprises a pair of surrounding edges and an intermediate edge;
   the intermediate edge being positioned in between each of the pair of surrounding edges; and
   a diameter of the pair of surrounding edges being greater than a diameter of the intermediate edge.

2. The device for hose barb retention as claimed in claim 1 further comprises:
   a bumper;
   the hose barb being concentrically aligned with the bumper; and
   the bumper being mounted along the structural body adjacent the second serrated portion and opposite the intermediate smooth lateral section.

3. The device for hose barb retention as claimed in claim 1 further comprises:
   a threaded portion;
   the bumper comprises an internal lateral surface and a set of internal threads;
   the set of internal threads being distributed along the internal lateral surface;
   the threaded portion being positioned adjacent the second serrated portion and opposite the intermediate smooth lateral section; and
   the set of internal threads being engaged with the threaded portion, wherein the bumper is removably attached to the hose barb.

4. The device for hose barb retention as claimed in claim 1, wherein the bumper is permanently connected to the hose barb.

5. The device for hose barb retention as claimed in claim 1 further comprises:
   a hose band clamp;
   the hose band clamp comprises a first circular band, a second circular band, and at least one connecting tab;
   the first circular band being concentrically aligned with the second circular band;
   the first circular band being positioned adjacent the second circular band;
   a primary end the at least one connecting tab being terminally connected to the first circular band; and
   a secondary end of the at least one connecting tab being terminally connected to the second circular band.

6. The device for hose barb retention as claimed in claim 5 further comprises:
   a hose section;
   the hose barb being positioned into the hose section, wherein the first end, the first plurality of serrations, the second plurality of serrations, and the intermediate smooth lateral section are sleeved by the hose section;
   an attachment end of the hose section being pressed against the bumper;
   the first circular band being perimetrically aligned with a first plurality of serrations and a first serrated portion of the second plurality of serrations, wherein the first circular band is pushed against the hose section through a first fastener;

the second circular band being perimetrically aligned with a second serrated portion of the second plurality of serrations, wherein the second circular band is pushed against the hose section through a second fastener; and the hose band clamp being pressed against the bumper.

7. The device for hose barb retention as claimed in claim 1 further comprises:

a third plurality of serrations;

the third plurality of serrations being distributed along the intermediate smooth lateral section in between the first serrated portion and the second serrated portion; and each of the third plurality of serrations being oriented perpendicular to each of the second plurality of serrations.

\* \* \* \* \*